United States Patent
Steelman et al.

(10) Patent No.: US 6,474,389 B1
(45) Date of Patent: Nov. 5, 2002

(54) VACUUM-ASSISTED LAMINATOR AND METHODS OF USING THE SAME

(75) Inventors: Ronald S. Steelman, Woodbury; John R. David, Stillwater, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/491,106

(22) Filed: Jan. 25, 2000

Related U.S. Application Data

(63) Continuation-in-part of application No. 09/236,807, filed on Jan. 25, 1999, now abandoned.

(51) Int. Cl.[7] .............................................. B30B 5/00
(52) U.S. Cl. ...................... 156/382; 156/555; 156/582; 156/583.1
(58) Field of Search ................................ 156/285, 382, 156/555, 580, 581, 582, 583.1

(56) References Cited

U.S. PATENT DOCUMENTS

| | | | |
|---|---|---|---|
| 4,867,816 A | 9/1989 | Suiter | 156/71 |
| 4,944,514 A | 7/1990 | Suiter | 273/51 |
| 5,122,959 A | 6/1992 | Nathanson | 364/436 |
| 6,248,301 B1 * | 6/2001 | Beck | 156/286 |

FOREIGN PATENT DOCUMENTS

| | | |
|---|---|---|
| DE | 2160144 | 6/1973 |
| DE | 19733935 | 2/1999 |
| EP | 0 354 230 B | 2/1990 |
| EP | 787539 | 8/1997 |
| FR | 2 300 249 A | 9/1976 |
| FR | 2643487 | 8/1990 |
| FR | 2 743 963 A | 7/1997 |
| JP | 63059517 | 3/1988 |
| JP | 01123723 | 5/1989 |
| WO | WO97/31077 | 8/1997 |

OTHER PUBLICATIONS

Brady, H., "Ten Steps to Successful Vinyl Truck Lettering", *SignCraft Magazine*, Issue 74, Jan./Feb. 1994.

* cited by examiner

*Primary Examiner*—James Sells
(74) *Attorney, Agent, or Firm*—James D. Christoff

(57) ABSTRACT

A vacuum-assisted lamination apparatus and methods of using the same to laminate a film to a substrate or two or more continuous webs together are disclosed. The apparatus includes a series of rolls and a partial vacuum source to provide pressure on a film or films.

24 Claims, 3 Drawing Sheets

US 6,474,389 B1

VACUUM-ASSISTED LAMINATOR AND METHODS OF USING THE SAME

RELATED APPLICATIONS

This application is a continuation-in-part of U.S. patent application Ser. No. 09/236,807, filed on Jan. 25, 1999, abandoned which is hereby incorporated by reference in its entirety.

FIELD OF INVENTION

This invention concerns apparatus and methods for laminating films. More particularly, the present invention provides apparatus and methods using vacuum to generate a laminating force.

BACKGROUND OF INVENTION

The lamination of films often requires that pressure be supplied to force the film against a substrate to which it is to laminated. The substrate to which the film is to be laminated may be another film, a fabric, a structure (e.g., the side of vehicle, a wall, etc.) or any other object. The films are often coated with an adhesive to adhere the film to the substrate, but lamination of the adhesive-coated film under pressure often assists in providing a more secure bond between the film and the substrate. The use of pressure may also provide other advantages, e.g., reducing bubble formation, improving conformity, etc.

Although it is desirable to use pressure when laminating a film to a substrate, it can be difficult to provide enough pressure to effectively influence the lamination process. For example, when laminating two films to each other over, e.g. a roll structure, allowances must be made for deflection of the rolls because the lamination force can typically be applied only at the ends of the rolls. The result is that the size and weight of the rolls and supporting structure may be massive to compensate for roll deflection while generating sufficient and uniform pressure at the lamination point.

Another example can be found in the application of adhesive-coated plastic films, especially vinyl films, to a variety of surfaces for a variety of reasons such as advertisement, decoration, protection and the like. These surfaces can be very large in area, typically as much as 3 m×16 m. These films are adhered to very large horizontal or vertical surfaces such as walls, truck trailer sides, billboards, and the like. The films are seldom large enough to cover the entire surface with a single, integral film, so multiple films are typically used. In addition, attempts to make larger films result in films that are more difficult to handle and to register to other films. These surfaces have vast even and uneven portions, such as a truck trailer side that has flat surfaces interrupted by either corrugations or rivets, or both. These surfaces with some combination of flat portions, protrusions, and indentations require very skilled persons to adhere the film to the surfaces and then assure that such film adheres also to the protrusions or indentations, or both.

In the most common methods of applying these films, a small plastic squeegee approximately 10 cm long is typically used to manually force the film against the substrate. This is a very labor intensive process. Furthermore, this application requires skill and patience to get an application that is well adhered, free of wrinkles, and in which all films are in register.

Current techniques for treating rivets to minimize lifting involve (a) perforating the film around the rivet, (b) heating the film with a heat source, usually and hot air gun or a torch, and (c) burnishing down the film with a stiff brush, usually about 2.54 cm in diameter with 1.25 cm long bristles attached to a short wooden handle called a rivet brush. Often post-treatment with heat is used to increase bonding and further reduce stress in the film after it has been adhered to the irregular substrate. The film is typically heated while it is bridging the area around each type of surface irregularity, which can be summarized to be either a protrusion or an indentation. Because of the low mass of the film and the high temperature of the heat source, heating rates are several hundred degrees per second. Similar cooling rates are also occurring. If the film is too soft because of the heating when it is contacted with a circular motion using the rivet brush, the film is likely to be damaged. If the film is too cool, the stress is not eliminated adequately and lifting results eventually. It is therefore very difficult for one skilled in the art to assuredly adhere the adhesive-coated film to the irregular surface while the film is fully softened without damaging the film. If there is damage, the film is weakened at that location and diminishes the durability of the film. If there is an image graphic on that film, the image is marred at the damaged location. An aberration in an image, even if the image is as large as a mural on the side of truck trailer, is quite noticeable and unsatisfactory to the owner of the trailer, the marketer of a product shown in the mural on the trailer, and the graphic fabricator that has invested considerable labor and other effort to adhere the graphic film to the side of the trailer.

SUMMARY OF INVENTION

The present invention provides apparatus and methods for laminating films to substrates where lamination pressure is generated at least partially by a vacuum drawn in a vacuum cavity. Advantages of the apparatus and methods include the ability to provide relatively high pressures without the expected massive mechanical structures and, in addition, the uniformity of the lamination pressures across the width of the apparatus.

The apparatus and methods may be particularly useful to assist in the application of adhesive-coated plastic films, particularly vinyl films, to large area surfaces to provide improved appearance, durability, etc. Some of the most common surfaces include truck sides, walls, signs, portions of a building, vehicles, etc. These large surfaces require extensive time and labor for application of films. This often adds more cost to the project that does the film itself. Furthermore, many of these applications are on surfaces that contain compound-curved protrusions or indentations such as channels or rivets or other irregularities that increase application time and often produce wrinkles.

One problem in the art is that the application of films is being done using a small (approximately 10 cm) squeegee on very large graphics. With typical surfaces 3 meters high and 16 meters long in, e.g., truck applications and possibly much bigger for building graphics, application of the film can be very time consuming. The small rivets on the surface or series of indentations further complicate the application and are a source for wrinkles and similar defects.

The present invention solves the problem in the art by using a totally different technique, the. force generated by a partial vacuum at the interface of application, to adhere adhesive-coated films to large area surfaces. The technique is also especially effective on smaller, irregular surfaces.

In one aspect, the present invention provides an apparatus including a first end and a second end; a first roll having a longitudinal axis extending between the first and second ends; a second roll having a longitudinal axis extending between the first and second ends, wherein the second roll is spaced apart from the first roll, and further wherein the longitudinal axes of the first and second rolls are generally parallel with each other; a seal mechanism extending between the first and second ends and the first and second rolls, wherein the seal mechanism roll forms a seal with each of the first and second rolls; a vacuum cavity formed between the seal mechanism and the first and second rolls; and a vacuum port in fluid communication with the vacuum cavity.

In another aspect, the present invention provides an apparatus including a first end and a second end; a pair of first rolls including an upper and lower first roll forming a first nip, each of the first rolls having a longitudinal axis extending between the first and second ends; a pair of second rolls including an upper and lower second roll forming a second nip, each of the second rolls having a longitudinal axis extending between the first and second ends, wherein the second nip and the second rolls are spaced apart from the first nip and the first rolls, and further wherein the longitudinal axes of the first and second rolls are generally parallel with each other; an upper seal mechanism extending between the first and second ends and the upper first and second rolls, wherein the upper seal mechanism forms a seal with each of the upper first and second rolls; a lower seal mechanism extending between the first and second ends and the lower first and second rolls, wherein the lower sealing roll forms a seal with each of the lower first and second rolls; a vacuum cavity formed between the upper and lower seal mechanisms, the first and second rolls, and the lower first and second rolls; and a vacuum port in fluid communication with the vacuum cavity.

In another aspect, the present invention provides a method of laminating a film by providing an apparatus according to the present invention; locating the apparatus proximate a substrate, wherein the substrate further defines the vacuum cavity; locating a film between the substrate and at least one of the first and second rolls of the apparatus; drawing a vacuum through the vacuum port in the apparatus, wherein a negative pressure is provided in the vacuum cavity of the apparatus, wherein the first and second rolls are drawn towards the substrate; and moving the apparatus along a substrate in a lamination direction.

In another aspect, the present invention provides a method of laminating at least two continuous webs together by providing an apparatus according to the present invention; threading a first web and a second web through a first nip in the apparatus; drawing a vacuum through a vacuum port in the apparatus, wherein a negative pressure is provided in the vacuum cavity, and wherein the upper first roll and the lower first roll forming the first nip drawn towards each other, whereby a lamination pressure is provided at the first nip; and moving the first and second webs through the first nip.

Another aspect of the present invention is a method of saving labor of adhering an adhesive-coated film to a substrate, comprising (a) distributing film to a party that has been taught to use the applicator of the present invention and the method of the present invention; (b) optionally permitting such party to print an image on the film; and (c) permitting such party to use the applicator and method to adhere the film to a surface of the substrate.

A feature of the present invention is the laminator utilizes a partial vacuum, also known as negative pressure, in a vacuum cavity of the laminator to generate pressure on the laminator at the interface between the laminator and the substrate where a film is subsequently laminated. The resulting lamination pressure is essentially uniform across the lamination area because the negative pressures within the vacuum cavity are substantially equal.

When used to laminate, e.g., two or more films to each other, one advantage of the present invention is that, by relying at least partially on vacuum to generate lamination pressure, significant lamination pressures can be obtained without relying on the massive structures typically associated with pressure lamination equipment.

When used to apply graphic images and other films to, e.g., trucks, other vehicles, sign surfaces, buildings, etc., one advantage of the present invention is labor savings of such significance that the overall total cost of an image graphic film applied to a large vertical or horizontal substrate, especially one having multiple compound or irregular surfaces can be substantially reduced. Furthermore, the quality of application is significantly improved, and often, lower adhesion adhesives can be used which reduce graphic removal time. Even with the cost of film remaining constant, the labor savings reduces the total cost of application of the film by as much as 80% and reduces the total cost of the applied film on a truck trailer by as much as 40%.

When, in conjunction with vacuum, heat is used (as disclosed in, e.g., copending, commonly-assigned, U.S. patent application Ser. No. 09/236,806, filed on Jan. 25, 1999, and its continuation-in-part patent application, U.S. patent application Ser. No. 09/479,648 filed on Jan. 7, 2000), the conformability of the film around irregular or compound-curved surfaces is improved such that less aggressive adhesives can be used. These adhesives, often called removable or changeable adhesives, can save 80% of the time normally associated with removal of the graphic films. This can further cut the total cost of installed and removed applied films by as much as 60%.

With these substantial labor savings using the article and method of the present invention, one company can provide an entire product of both film goods and installation/removal services at a price considerable less than currently offered where the producer of the film goods and the installer of the film goods are unrelated companies.

Another advantage of the invention is that large sheets of film can be laminated to surfaces at high productivity of speed and assured lamination.

Another advantage of the invention is that the apparatus and methods are effective on both fabric-sided trucks and metallic-sided trucks, making one technique versatile for a graphics film installer. The fabric and the metal can both flex under the partial vacuum applied by the laminator of the present invention, improving the uniformity of the lamination pressure.

Another advantage of the invention is that the laminator can provide nearly 100% wetting area of the adhesive against the surface of the substrate whereas conventional squeegee usage can only achieve about 80% wetting. The use of a partial vacuum uses the power of a fluid to apply equal pressure at every point of contact of the film to the surface, something that is extremely difficult, if not impossible, to achieve when applying pressure with a device such as a squeegee. That advantage is even more apparent with surfaces that are filled with irregularities or compound curves or both.

As used in connection with the present invention, the term "vacuum" is used to describe negative pressure as compared to ambient pressure. The term does not require that an absolute or extremely negative pressure vacuum be drawn or maintained, although in some instances it may be possible and/or desirable to achieve large negative pressures in connection with the present invention.

Other features and advantages will be described below using the following drawings.

ILLUSTRATIVE EMBODIMENTS OF INVENTION

Figure 1:
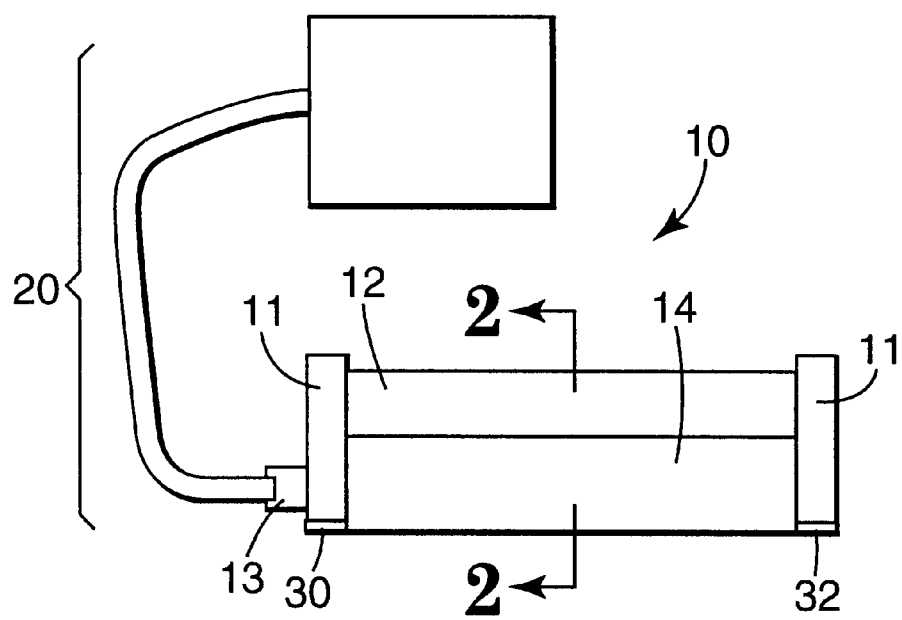
FIG. 1 is a diagrammatic front view of one lamination apparatus of the present invention.
Figure 2:
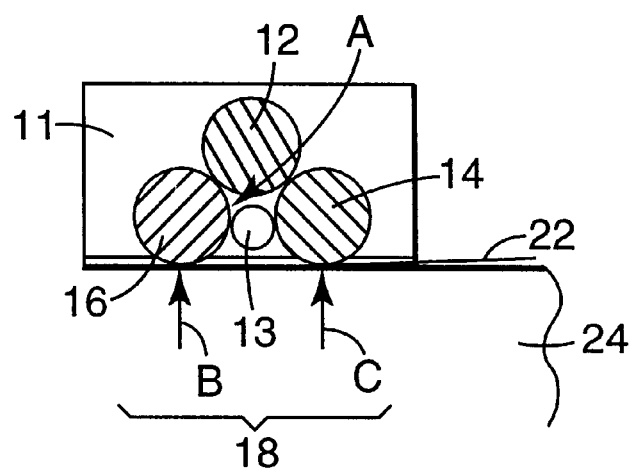
FIG. 2 is a diagrammatic cross-sectional view of the apparatus of FIG. 1 along lines 2—2 in FIG. 1.

FIGS. 1 and 2 show one lamination apparatus 10 having a frame 11. At least one end of the frame 11 includes a vacuum port 13 in fluid communication with a vacuum cavity A formed in between the rolls 12, 14, and 16. The rolls 12, 14, and 16 combine to defined the vacuum cavity A and to provide lamination pressure on a film. The rolls 12, 14 and 16 are preferably circular and rotate about longitudinal axes extending through their centers. The longitudinal axes of the rolls are generally parallel to each other.

The lamination apparatus 10 may also include a vacuum or negative pressure source 20 that generates a partial vacuum (negative pressure) within the vacuum cavity A. That vacuum draws the outer rolls 14 and 16 against film 22 and the substrate 24 to provide the desired lamination pressure.

The substrate 24 on which the outer rolls 14 and 16 are mounted may be flat, or it may be curved such as, e.g., a roll. Furthermore, substrate 24 may be another film located on a flat or curved surface and to which the film 22 is to be laminated. In other applications, the substrate may be flexible, but under tension such as, e.g., a fabric surface used on a truck trailer.

Although the illustrative embodiments depicted herein rely on sealing rolls, the seal mechanisms used in the laminating apparatus of the present invention could alternatively be replaced with multiple rolls or a hard shell with vacuum seals against the outer rolls 14 and 16.

Figure 3:
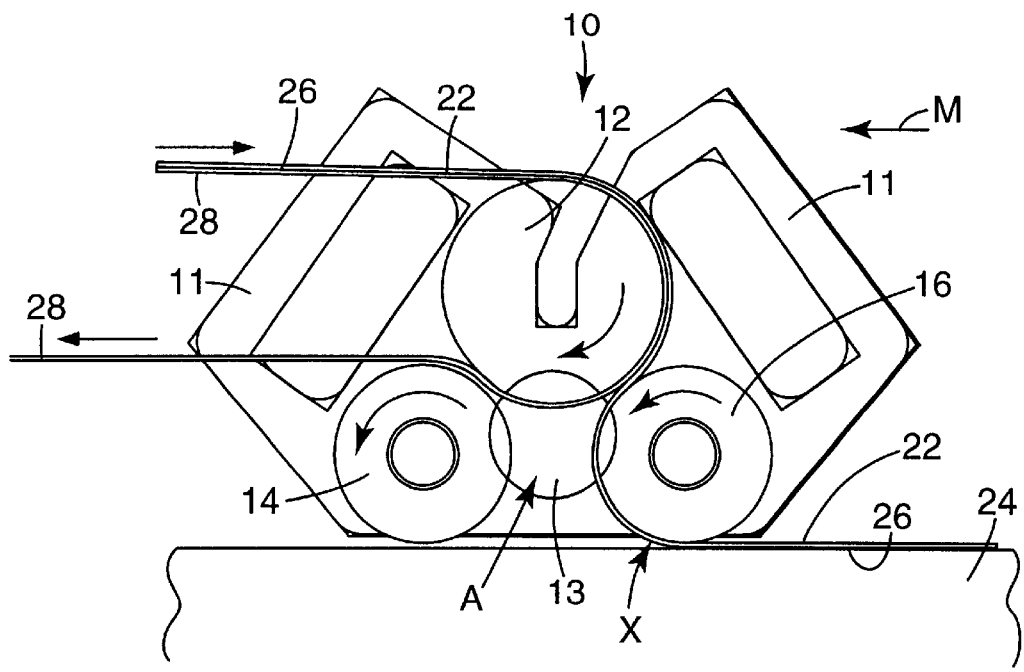
FIG. 3 is a diagrammatic side view of one use of a lamination apparatus of the present invention.

As seen in FIG. 3, the film 22 may include, e.g., a coating of a pressure sensitive or pressure activated adhesive 26 protected by a liner 28. The lamination apparatus 10 greatly aids in the lamination of, e.g., pressure sensitive adhesive coated films to surfaces such as truck sides, signs, etc. As discussed below, the present invention also provides vacuum-assisted lamination apparatus and methods that can be used to laminate two sheets or films together in continuous web processes.

The outer rolls 14 and 16 of the laminator 10 are provided to seal against a substrate surface 24 as well as to provide the desired lamination pressure along those nip points. One of the outer rolls 14 and 16 may be harder or less conformable that the other to improve lamination. One or both of the nips formed between the outer rolls 14 and 16 may also include a film 22 being laminated to the substrate surface 24. The sealing roll 12 is provided to define and seal the vacuum cavity A between the outer rolls 14 and 16. The sealing roll 12 forms a rolling seal with each of the outer rolls 14 and 16. The sealing roll 12 may also provide a nip point at which a liner or other layer can be stripped from a film before it is laminated to the substrate surface 24.

It may be desirable that at least a portion of the sealing roll 12 be transparent, such that the vacuum cavity A can be visually monitored during lamination. In some instances, the transparent portion may extend over the length of the roll 12, and in other instances, only a portion of the length may be transparent.

Referring to FIG. 2, the force of negative pressure from source 20 (see FIG. 1) generates a partial vacuum within vacuum cavity A between the rolls 12, 14, and 16 and the substrate 24. Subatmospheric pressure within the vacuum cavity A, compared with ambient pressure outside of vacuum cavity A then draws the rolls 12, 14, and 16 and the surface 24 together, thus creating pressure on the surface of rolls 14 and 16 in contact with the substrate surface at contact interfaces B and C.

The pressure distributed over the length of the rolls is at least partially dependent on (1) the distance between interfaces B and C times the length of laminator 18, (2) the negative pressures that can be obtained in the vacuum cavity A. For example, the lamination pressure at interfaces B and C may be about 175 Newtons/m (1 lbs./in) or more, more preferably about 250 Newtons/m or more. In some instances, it may be desirable to achieve pressures of about 1000 Newtons/m or more, even more desirably, about 2000 Newtons/m or more, and still more desirably about 3000 Newtons/m or more.

The upper pressure limit will depend on a variety of factors such as the strength of the components used in the lamination apparatus 10, the capabilities of the vacuum source, the strength of the surface 24 to which films are being laminated, etc. In some instances it may be desirable to provide a pressure relief device or devices to relieve excessive pressures before the lamination force becomes too great. Pressures in excess of 4500 Newtons/m are possible with 30 cm roll spacing and only 30% air evacuation in the vacuum cavity.

A set of rolls 12, 14, and 16 that are each 137 cm (about 54 inches) long with a distance of 20.3 cm (8 inches) between interfaces B and C and a standard shop vacuum as source 20 that generates 27.4 kPa could apply 3818 Newtons per roll or 2,783 Newtons/m (858 lbs./roll or 15.89 lbs/lineal in./roll) of force to each of the two rolls 14 and 16 at each of interfaces B and C. Using conventional frames and mounting systems, it would be very difficult to apply that much pressure to the rolls without either deflecting the rolls or the substrate surface. Such a frame would also be massive, very heavy, and very difficult to handle by persons skilled in the art, especially against a vertical surface.

Optionally but preferably, FIG. 1 shows conformable seals 30 and 32 on frame 11 to assist in the formation of negative pressure within the vacuum cavity A in the two directions orthogonal to interfaces B and C.

Because vacuum is used to supply the lamination forces and the negative pressure is distributed substantially equally over the surfaces of the rolls 12, 14, and 16, relatively insubstantial roll structures are required for rolls 12, 14, and 16. In many instances, the roll structures may include hollow cores. Those lightweight structures can be contrasted with the massive metal rolls that would otherwise be required for positive pressure lamination using rolls to limit undesirable roll deflection near the middle of the rolls. The rolls used in the lamination apparatus of the present invention may, in some instances, weigh less than one-tenth of the conventional metallic rolls needed to apply over 3800Newtons of force with a similar length device.

The rolls used in the apparatus and methods of the present invention may preferably include outer surfaces that are soft enough to conform to the substrate surface. The use of conformable rolls may improve sealing at the nip points between the rolls, which can assist in the generation and maintenance of desirable negative pressure levels in the vacuum cavity. The conformability may also be useful to improve contact between the rolls and films being laminated when confronting irregularities or compound curves on the surface. Thus, if the substrate surface contains raised or lower areas, such as rivets or dents, soft rolls are desired to insure complete compliance of the film with the substrate surface. A soft rubber roll with a high coefficient of friction to the pressure sensitive film works very well on riveted surfaces. Another possible roll composition is foam rubber. Furthermore, it has been found that an intimate contact of the film to the roll at the interface of application to the substrate helps prevent wrinkling from occurring when applied over rivets and on irregular surfaces. A high degree of wrap also aids in supporting the film.

Presently preferred for surfaces containing irregularities is a soft rubber roll having a Shore Scale hardness of from about Shore 00 10 to about Shore A 60, more preferably from about Shore 00 30 to about Shore A 30. If the substrate does not contain irregularities, harder roll surfaces (e.g., metallic surfaces) may be used and can potentially develop higher pressures as compared to softer rolls.

The diameters of the rolls 12, 14, and 16 can vary depending on a number of factors such as the lamination pressures desired, the length of the rolls, etc. It may be desirable that the relative diameters of the rolls possess certain relationships. For example, it may be desirable that the outer rolls 14 and 16 have substantially equal diameters. It may also be preferred that the sealing roll 12 located between both outer rolls 14 and 16 have a larger diameter than the outer rolls 14 and 16 to increase the spacing between the outer rolls 14 and 16 without making all of the rolls larger. In some instances, the distance (D) between the centers of the outer rolls 14 and 16 may be determined by the following equation:

$$D=\sqrt{(2AB+A^2)}$$

where A is the diameter of each of the outer rolls 14 and 16 (which are the same) and B is the diameter of the sealing roll 12 to reduce or prevent the rolls from bending when a vacuum is drawn in the vacuum cavity A.

In some instances, such as the application of polymeric films carrying graphic images to, e.g., truck trailers, the rolls 14 and 16 may have diameters ranging from about 4 cm to about 23 cm, preferably from about 5 cm to about 13 cm.

It may be desirable that the size and construction of the rolls 12, 14, and 16 be such that, during lamination, the outer rolls 14 and 16 deflect or bow inwardly towards each other. Alternatively, it may be desirable if only the outer roll or rolls' around which a film is wrapped deflect or bow inwardly. Such deflection may assist in reducing wrinkles in the lamination process by, in effect, spreading the film outwardly from the center of the deflected rolls. The deflection may be controlled by varying the tension on the film or films wrapped around the deflected roll or rolls. The deflection may also be controlled by varying the negative pressure in the vacuum cavity A, varying roll size, or varying spacing between outer rolls 14 and 16. In some instances, it may be desirable to use flexible rolls for laminating films on curved surfaces.

The applicator 10 can be mounted on horizontal or vertical rails or any other suitable structure for wide webs (greater than about 60 cm) or can be hand held or mounted on a hand held pole for narrow webs (less than about 30 cm). Therefore, the width of the applicator 10 can be varied according to the needs of those skilled in the art and can be used to adhere films ranging from wallpaper to graphic marking film marketed by Minnesota Mining and Manufacturing Company (3M) of St. Paul, Minn., USA under the brands of Controltac™ and Scotchcal™ films.

FIG. 3 shows one use of the laminator 10 of the present invention. A laminate of film 22, adhesive 26, and liner 28 (protecting adhesive 26) are threaded between sealing roll 12 and roll 16 and separate between roll 12 and roll 16, with liner 28 following the circumference of roll 12 to roll 14 and the adhesive-coated film 22 following the circumference of roll 16 to a point of contact with substrate 24, indicated as interface X within vacuum cavity A. Within vacuum cavity A, the outer roll 16 forces the adhesive 26 on film 22 against substrate 24 at interface X as rolls 14 and 16 rotate counterclockwise and sealing roll 12 rotates clockwise (as shown with appropriate arrows) and interface X advances in the direction of motion M.

Figure 4:
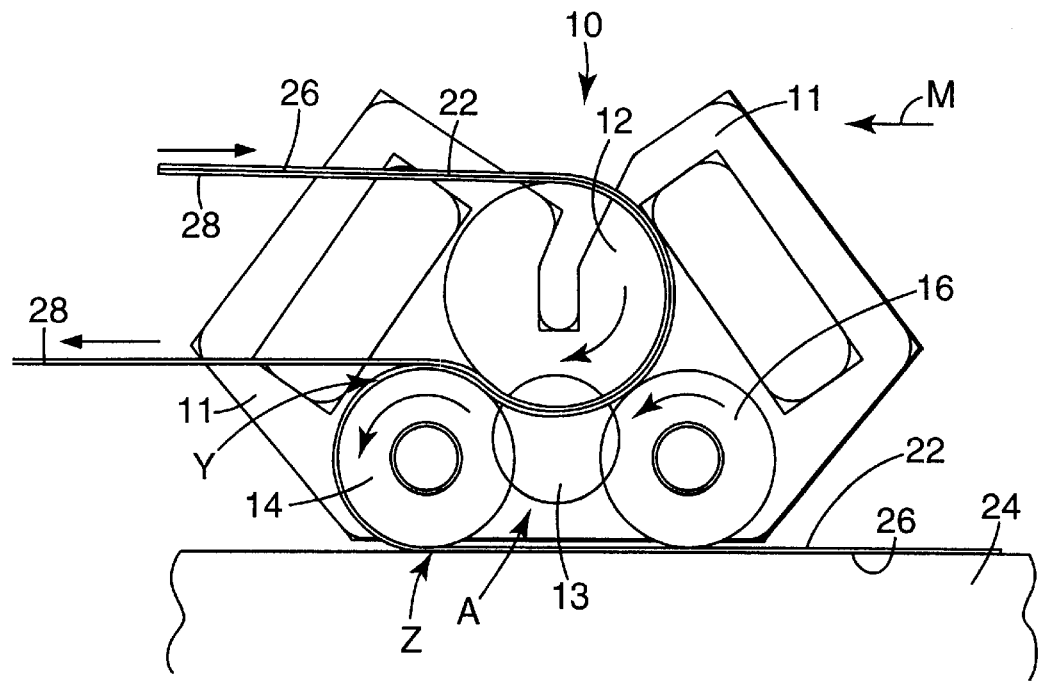
FIG. 4 is a diagrammatic side view of another use of a lamination apparatus of the present invention.

FIG. 4 shows another threading of film/liner laminate, where film 22, adhesive 26, and liner 28 enter the laminator 10 between roll 12 and roll 16 from the direction toward which applicator 10 moves (motion M). Thus the laminate of film 22 and liner 28 contacts the circumference of sealing roll 12, but the point of delamination occurs at point Y between roll 12 and roll 14 with liner 28 returning the same direction as motion M. In this embodiment, the film 22 first contacts substrate 24 outside of vacuum cavity A but is forced against the substrate 24 by outer roll 14 at interface Z once motion M causes film 22 to enter vacuum cavity A. Outer roll 16 also provides a laminating force against the film 22 and substrate 24.

Figure 5:
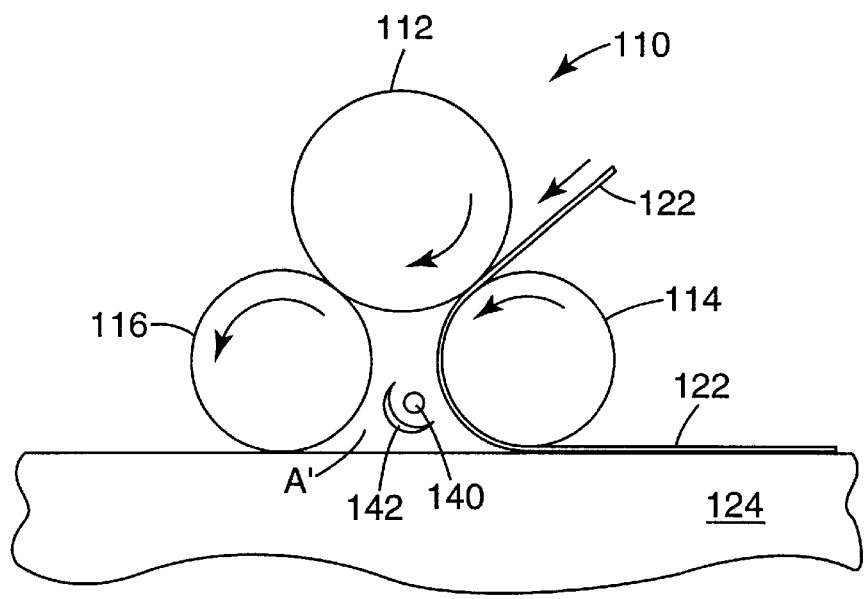
FIG. 5 is a diagrammatic side view of another lamination apparatus according to the present invention.

To improve lamination, one or both of the outer rolls 14 and 16 could also be heated. Referring to FIG. 5, in another alternative, a heating device may be positioned either outside of the laminator 110 to heat a film before it enters the vacuum cavity A' or, as illustrated in FIG. 5, a heating device 140 may be located within vacuum cavity A' to heat the film 122. The heating device 140 may include a heat shield to at least partially control the direction in which thermal energy travels. Examples of suitable heating devices include, but are not limited to: infrared heaters, resistance heaters, carbon filaments, quartz irradiators, etc. If the heat is applied while the film is outside the vacuum cavity, e.g., before entering or after exiting the vacuum chamber, hot air may be used.

The use of heat in connection with laminating films is disclosed in copending, commonly-assigned, U.S. patent application Ser. No. 09/236,806, filed on Jan. 25, 1999 and its continuation-in-part patent application, U.S. patent application Ser. No. 09/479,648 filed on Jan. 7, 2000.

The laminators of the present invention could ride on a mounting frame or otherwise conveyed across the surface of the substrate. Furthermore, the substrate surface is drawn toward the rolls so any uneven or flexible film is easier to use with the applicator of the present invention than with a pressure system.

USEFULNESS OF THE INVENTION

Laminators manufactured according to the present invention permit one skilled in the art to apply film 22 in subatmospheric pressure (FIG. 3) or atmospheric pressure (FIG. 4) using vacuum-assisted lamination pressures to quickly and assuredly adhere the film 22 against the substrate 24 even if such substrate 24 has surface aberrations, compound curves, or irregularities compared with a flat surface. The substrate can be aligned vertically or horizontally. The apparatus can traverse in any desired direction, e.g., horizontally, vertically, etc. Alternatively, the apparatus may remain stationary while the substrate moves.

Furthermore, the lamination pressures that can be achieved are not reliant on the forces used to move the laminator into position against a surface. For example, the lamination apparatus may be held on an extend pole above the head of, e.g., an operator. After a vacuum is drawn in the vacuum cavity, the laminator can supply the desired lamination forces independent of the forces provided by the operator on, e.g., the outer frame of the device. In another example, the lamination apparatus may be suspended on ropes, cables, or other structures that move it into position over a substrate. Activation of the vacuum source can then draw the laminator against the substrate to provide the desired lamination pressures.

Any adhesive-coated film can benefit from the applicator of the present invention, e.g., heat activated adhesives can be used in conjunction with heat. Nonlimiting examples of such films include any film presently sold by Minnesota Mining and Manufacturing Company (3M) of St. Paul, Minn., USA under the brands of Scotchcal™; Controltac™ and the like.

It has been found that an adhesive-coated film, namely: Controltac™ 180 film can be successfully adhered using the applicator of the present invention. It has also been found that as much as 80% of the time normally required for adhering a typical graphic marking film can be saved, reducing the total cost of adhering such film by as much as 40%.

An entirely new business method can be created using the applicator and methods of the present invention. The business method comprises contracting with an owner of an image to make that image on a graphic marking film, wherein the maker of the graphic marking film prints the image and assembles the image graphic film onto a substrate using the applicator and method of the present invention. Alternatively, the film maker can subcontract the use of the applicator and method to permit remote subcontractor(s) to assemble the graphic film(s) on the substrate(s) for further distribution or usage. Preferably, the image is distributed to multiple remote locations and printed and assembled using the same techniques at all locations, all benefiting from the labor savings afforded by the applicators and methods of the present invention.

The vacuum assist applicator of the present invention can also be used to "finish" a pressure sensitive film that is lightly adhered to a surface, in which case it would not pass between the rolls, but the rolls would only apply high pressure.

Figure 6:
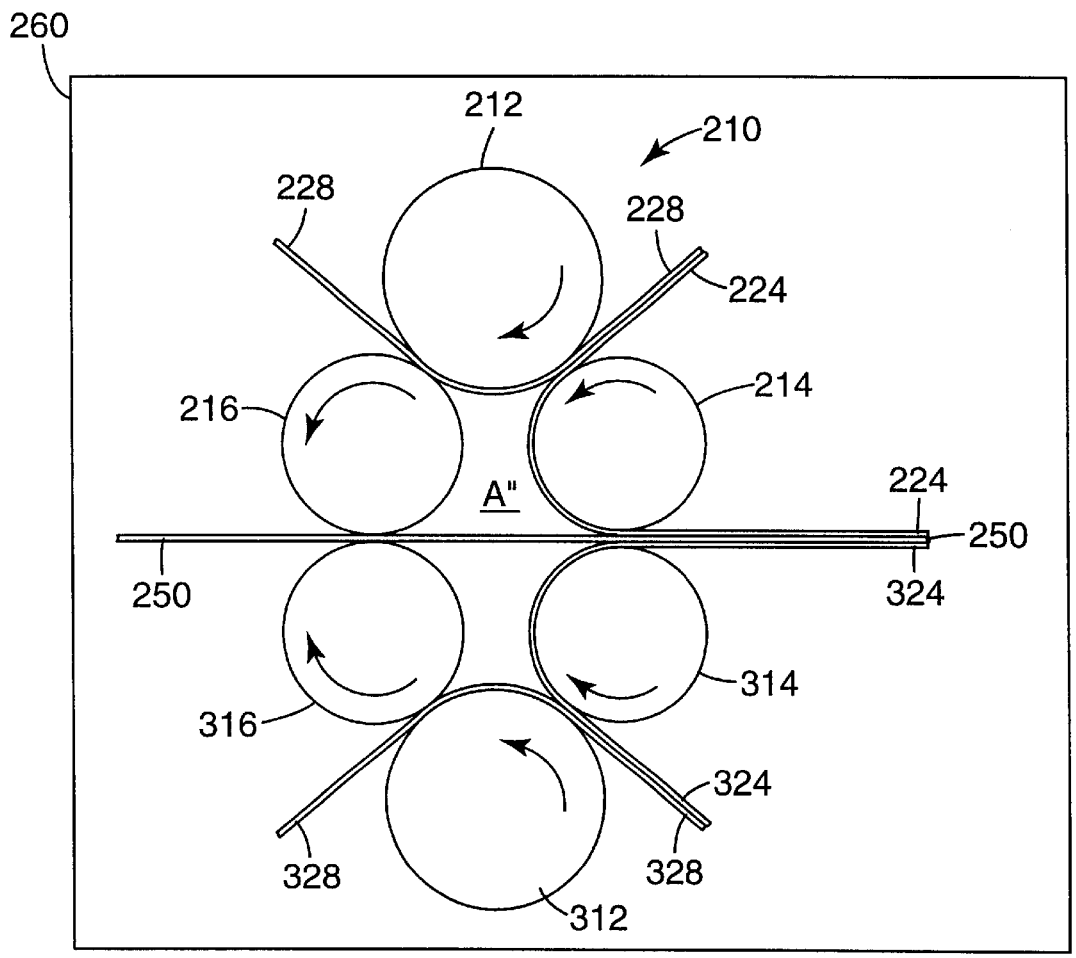
FIG. 6 is a diagrammatic side view of another lamination apparatus according to the present invention.

Yet another lamination apparatus and method according to the present invention is illustrated in FIG. 6. This apparatus 210 may be particularly useful in continuous web processes for laminating two or more continuous webs to each other. By "continuous," it is meant that the webs being laminated have a length that is substantially longer than the distance between the outermost rolls used to supply the lamination pressure.

The apparatus 210 will be described using the terms "upper" and "lower" for reference purposes only. It should be understood that the apparatus 210 may be used in any desired orientation and that the terms used to describe the relative positions for the components should not be construed as limiting.

Turning to FIG. 6, the apparatus 210 includes upper outer rolls 214 and 216 and an upper sealing roll 212 in an orientation relative to each other that is similar to the rolls 12, 14 and 16 in apparatus 10 described above. The apparatus 210 also includes lower outer rolls 314 and 316 and a lower sealing roll 312. All of the rolls are preferably oriented generally parallel to each other. The outer rolls 214 and 314 form a first nip between them and the outer rolls 216 and 316 form a second nip. The nips formed by the respective pairs of outer rolls are spaced apart. Together, the rolls combine to define a vacuum cavity A" in which a negative pressure can be maintained.

Pressure at the nips formed by the outer rolls can also be provided by enclosing the rolls in a pressurized chamber 260, with each of the webs entering the chamber through sealed openings or being contained entirely within the enclosure. In this embodiment, the cavity A" can be maintained at atmospheric pressure or it can still be evacuated to further increase the nip pressure.

The upper outer rolls 214 and 216 are preferably mounted separately from the lower outer rolls 314 and 316 so that, when a negative pressure is provided in the vacuum cavity A", the upper outer rolls 214 and 216 are drawn against their respective lower outer rolls 314 and 316, thereby providing the desired lamination pressure at the nips between the pairs of outer rolls. The apparatus 210 can then provide varying lamination pressures developed at the nips between the upper and lower rolls depending on the level of the negative pressures in the vacuum cavity A".

FIG. 6 illustrates a process in which a base continuous web 250 is moving through the apparatus 210 while an upper continuous web 224 and a lower continuous web 324 are laminated on opposing sides of the base web 250. FIG. 6 also depicts liners 228 and 328 being removed from the webs 224 and 324, respectively. The lamination of three webs is depicted for illustrative purposes only. It will be understood that the apparatus may alternatively be used to laminate only two of the three webs together or it may be used to laminate even more than three webs together. Additional laminations that do not require liner removal can be made at, above and below the incoming web 250 between rolls 216 and 316. Furthermore, the apparatus 210 may be used for performing a pressure-based process on only one web, e.g., embossing a web with a desired pattern using one of the outer rolls. Heat may also be introduced through one or more of the rolls or indirectly with hot air, infrared radiation, etc.

The preceding specific embodiments are illustrative of the practice of the invention. This invention may be suitably practiced in the absence of any element or item not specifically described in this document. The complete disclosures of all patents, patent applications, and publications are incorporated into this document by reference as if individually incorporated in total.

Various modifications and alterations of this invention will become apparent to those skilled in the art without departing from the scope of this invention, and it should be understood that this invention is not to be unduly limited to illustrative embodiments set forth herein, but is to be controlled by the limitations set forth in the claims and any equivalents to those limitations.

What is claimed is:

1. An apparatus comprising:
   a first end and a second end;
   a first roll having a longitudinal axis extending between the first and second ends;
   a second roll having a longitudinal axis extending between the first and second ends, wherein the second roll is spaced apart from the first roll, and further wherein the longitudinal axes of the first and second rolls are generally parallel with each other;
   a seal mechanism extending between the first and second ends and the first and second rolls, wherein the seal mechanism roll forms a seal with each of the first and second rolls;
   a vacuum cavity formed between the seal mechanism and the first and second rolls; and
   a vacuum port in fluid communication with the vacuum cavity.

2. The apparatus of claim 1, wherein seals formed by the seal mechanism comprise rolling seals.

3. The apparatus of claim 1, wherein the seal mechanism comprises at least one sealing roll having a longitudinal axis generally parallel to the longitudinal axes of the first and second rolls, the longitudinal axis of the sealing roll extending between the first and second ends, wherein the sealing roll forms a rolling seal with at least the first roll.

4. The apparatus of claim 1, further comprising end seals on the first and second ends, wherein the end seals further define the vacuum cavity proximate the first and second ends.

5. The apparatus of claim 1, wherein the vacuum port is located in one the first and second ends.

6. The apparatus of claim 1, further comprising a vacuum source in fluid communication with the vacuum port.

7. The apparatus of claim 1, wherein the first and second rolls each comprise a conformable outer surface.

8. The apparatus of claim 1, wherein at least a portion of the length of sealing roll is transparent, wherein the vacuum cavity can be visually monitored through the sealing roll.

9. The apparatus of claim 1, further comprising a heating device.

10. The apparatus of claim 9, wherein the heating device is located within the vacuum cavity.

11. The apparatus of claim 3, further comprising a film threaded between a nip formed by the first roll and the sealing roll, the film wrapping around a portion of the first roll.

12. The apparatus of claim 11, further comprising an adhesive on the film and a liner covering the adhesive, wherein the liner is removed from the film and adhesive as the film passes through the nip formed by the first roll and the sealing roll.

13. The apparatus of claim 1, wherein the first and second rolls are mounted on a roll substrate.

14. An apparatus comprising:
   a first end and a second end;
   a pair of first rolls comprising an upper and lower first roll forming a first nip, each of the first rolls having a longitudinal axis extending between the first and second ends;
   a pair of second rolls comprising an upper and lower second roll forming a second nip, each of the second rolls having a longitudinal axis extending between the first and second ends, wherein the second nip and the second rolls are spaced apart from the first nip and the first rolls, and further wherein the longitudinal axes of the first and second rolls are generally parallel with each other;
   an upper seal mechanism extending between the first and second ends and the upper first and second rolls, wherein the upper seal mechanism forms a seal with each of the upper first and second rolls;
   a lower seal mechanism extending between the first and second ends and the lower first and second rolls, wherein the lower sealing roll forms a seal with each of the lower first and second rolls;
   a vacuum cavity formed between the upper and lower seal mechanisms, the first and second rolls, and the lower first and second rolls; and
   a vacuum port in fluid communication with the vacuum cavity.

15. The apparatus of claim 14, wherein the seals formed by the upper and lower seal mechanisms with their respective upper and lower first and second rolls comprise rolling seals.

16. The apparatus of claim 14, wherein the upper seal mechanism comprises at least one upper sealing roll having a longitudinal axis generally parallel to the longitudinal axes of the first and second rolls, the longitudinal axis of the upper sealing roll extending between the first and second ends, wherein the upper sealing roll forms a rolling seal with at least the upper first roll.

17. The apparatus of claim 14, wherein the lower seal mechanism comprises at least one lower sealing roll having a longitudinal axis generally parallel to the longitudinal axes of the lower first and second rolls, the longitudinal axis of the lower sealing roll extending between the first and second ends, wherein the lower sealing roll forms a rolling seal with at least the lower first roll.

18. The apparatus of claim 14, further comprising end seals on the first and second ends, wherein the end seals further define the vacuum cavity proximate the first and second ends.

19. The apparatus of claim 14, wherein the vacuum port is located in one the first and second ends.

20. The apparatus of claim 14, further comprising a vacuum source in fluid communication with the vacuum port.

21. The apparatus of claim 14, wherein the first and second rolls each comprise a conformable outer surface.

22. The apparatus of claim 14, wherein at least a portion of the length of at least one of the sealing rolls is transparent, wherein the vacuum cavity can be visually monitored through the sealing roll.

23. The apparatus of claim 14, further comprising a heating device.

24. The apparatus of claim 23, wherein the heating device is located within the vacuum cavity.

* * * * *